United States Patent [19]

Wang et al.

[11] Patent Number: 4,855,616
[45] Date of Patent: Aug. 8, 1989

[54] APPARATUS FOR SYNCHRONOUSLY SWITCHING FREQUENCY SOURCE

[75] Inventors: Eugene T. Wang, Fremont; Stephen S. C. Si, Sunnyvale, both of Calif.

[73] Assignee: Amdahl Corporation, Sunnyvale, Calif.

[21] Appl. No.: 136,832

[22] Filed: Dec. 22, 1987

[51] Int. Cl.[4] .................... H03K 5/13; H03K 9/06; H03K 1/17; H03K 17/00

[52] U.S. Cl. ............................. 307/269; 307/480; 307/510; 307/522; 307/524; 307/527; 307/582; 328/72; 328/63

[58] Field of Search ............. 307/269, 480, 510, 522, 307/524, 525, 527, 582; 328/72, 63, 104, 154

[56] References Cited

U.S. PATENT DOCUMENTS

| | | | |
|---|---|---|---|
| 3,904,977 | 9/1975 | Barsotti | 328/154 |
| 3,932,816 | 1/1976 | McGregor | 328/154 |
| 4,156,200 | 5/1979 | Gomez | 307/269 |
| 4,229,699 | 10/1980 | Frissell | 307/269 |
| 4,398,155 | 8/1983 | Atwell, Jr. et al. | 307/480 |
| 4,419,629 | 12/1983 | O'Brien | 307/269 |
| 4,748,417 | 5/1988 | Spengler | 307/480 |

*Primary Examiner*—Stanley D. Miller
*Assistant Examiner*—Trong Quang Phan
*Attorney, Agent, or Firm*—Fleisler, Dubb, Meyer & Lovejoy

[57] ABSTRACT

A circuit responsive to a switching signal for dynamically changing the frequency source of a system clock. The circuit allows addition of new frequency sources without substantial changes to the circuit because its circuitry for detecting an inactive cycle period of the new frequency source is asynchronous (i.e. not clocked by the new frequency source).

10 Claims, 5 Drawing Sheets

APPARATUS FOR SYNCHRONOUSLY SWITCHING FREQUENCY SOURCE

TECHNICAL FIELD

This present invention relates generally to the control of a computer system. More specifically, this invention relates to an apparatus for switching a system clock from a first one to a second one of a plurality frequency sources.

BACKGROUND OF THE INVENTION

In the pursuit of faster and more powerful computers, more and more functions are being implemented into computers while their operating frequencies have been raised. Consequently, the probability that computer or circuit designers may have inadvertently provided too small a timing margin for noise induced signal fluctuations has also increased. When noise induced fluctuations push a signal over a given margin, a timing error will result.

Because of their dependence on noise, timing errors are usually very unpredictable, making the isolation thereof extremely difficult. Often, the only practical way to isolate a timing error is by "aggravating" the error, that is, by varying the system clock frequency so as to cause it to occur more consistently. There is thus a need for an apparatus whereby a system clock can be switched to different frequencies.

There is another reason for changing the frequency of a system clock. When a timing problem suddenly occurs (due to a change in component characteristics, such as current amplification of a transistor) during critical operations of a computer, it may be desirable to temporarily bypass the timing error by dynamically lowering the frequency of the system clock and thereby increasing the timing margin.

Varying the system clock frequency to either aggravate or to avoid a timing error should desirably be done incrementally because the frequency cannot be changed too much that other timing errors are introduced. Thus, it is desirable for a system to have many sources providing different frequencies so that an optimal one can be chosen.

The capability to change frequency source is also useful in a multiprocessor system when, in order to make the system processors tightly-coupled, the system clock of one processor is used to drive the other processors.

When switching a system clock to a new frequency source, the clock is typically stopped, the new frequency source switched in, and the system clock then restarted. Because the old and the new frequency sources are usually not synchronized, there is a possibility that the system clock may be turned off or on during the active period of a system clock cycle. However, because prespecified activities are scheduled for each active system cycle period, narrowing an active clock period may erroneously cut off or introducing errors into some of these activities. Thus, it is desirable that the switch-over process be synchronized, that is, the old frequency source is disconnected and the new frequency is switched in during inactive periods.

A conventional clock switching circuit whereby the above-identified requirements have been satisfied is shown in FIG. 1. In each oscillator path of this conventional circuit, a pair of latches 101, 102 (e.g. LN1 and LN2), both clocked by a corresponding frequency source, are used to perform the above mentioned synchronization at switch-over. In this conventional clock switching circuit, however, each addition of a new oscillator to the system requires a substantial change in the circuit: including the addition of two latches 101, 102 (LNI, LN2) and a 2-input AND gate 103 (BN), the addition and the changing of the n-input AND gates 104 (A1, A2,..AN), as well as changing the n-input OR gates 105.

There is thus a need for a clock switching circuit whereby a system clock can dynamically be switched to a new frequency source and in which new frequency sources can be added without requiring substantial changes to the circuit.

SUMMARY OF THE INVENTION

This present invention provides a circuit responsive to a switching signal for dynamically switching a system clock from a first one to a second one of a plurality of frequency sources. The circuit comprises means responsive to said switching signal for disconnecting said first frequency source from the system clock during an inactive clock period; and means coupled to said disconnecting means for connecting said second frequency source to the system clock. The connecting means comprises gating means receiving said plurality of frequency sources for gating a selected frequency source in response to a given frequency source address; asynchronous means receiving said selected frequency source for detecting an inactive cycle period therein in response to said switching signal and for connecting said selected frequency source to the system clock during said inactive cycle period; and means coupled to said gating means and said asynchronous detecting means for sequencing said gating and said detection.

DETAILED DESCRIPTION

Figure 1:
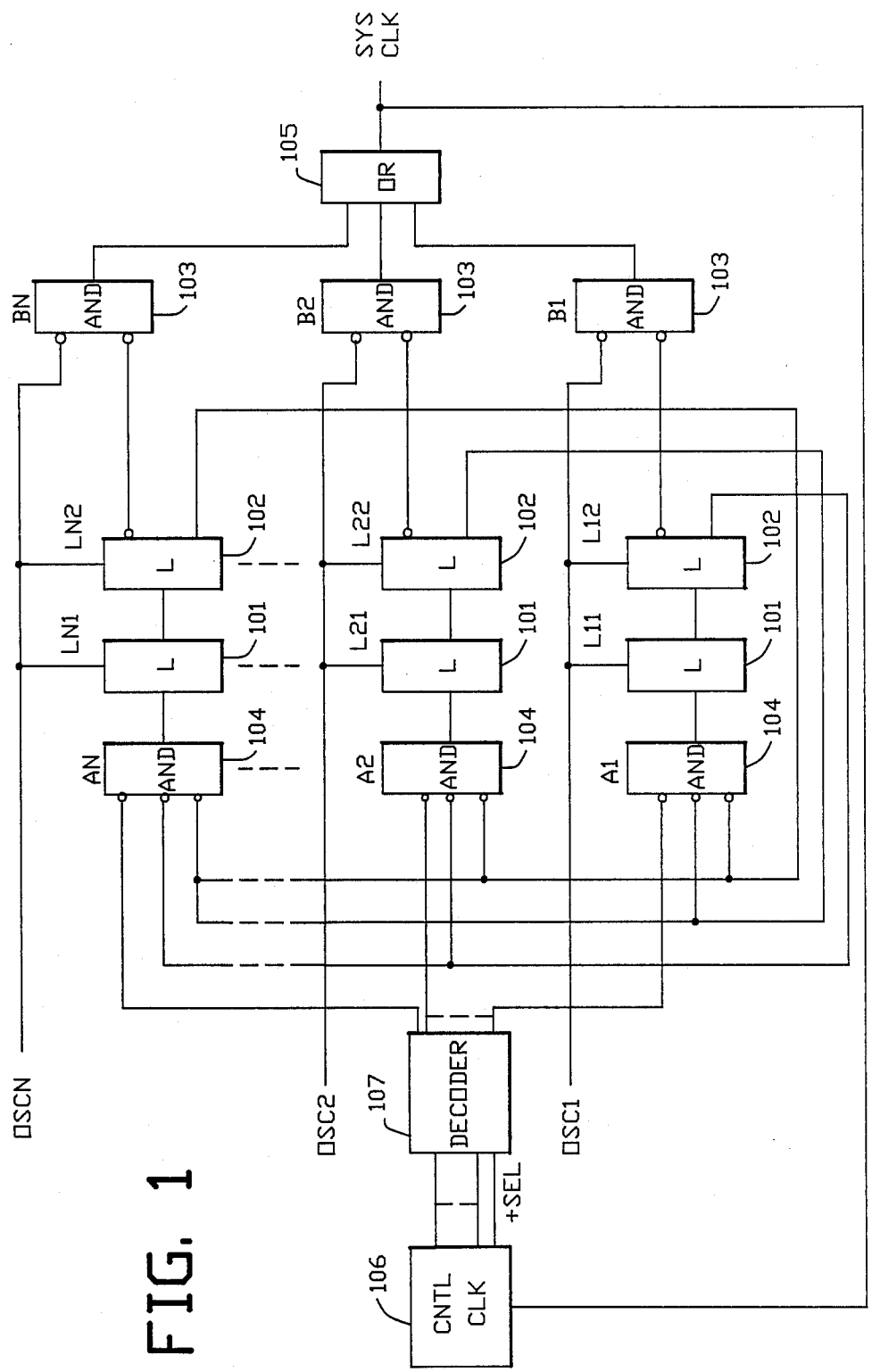
FIG. 1 is a block diagram of the conventional clock switching circuit.
Figure 2:
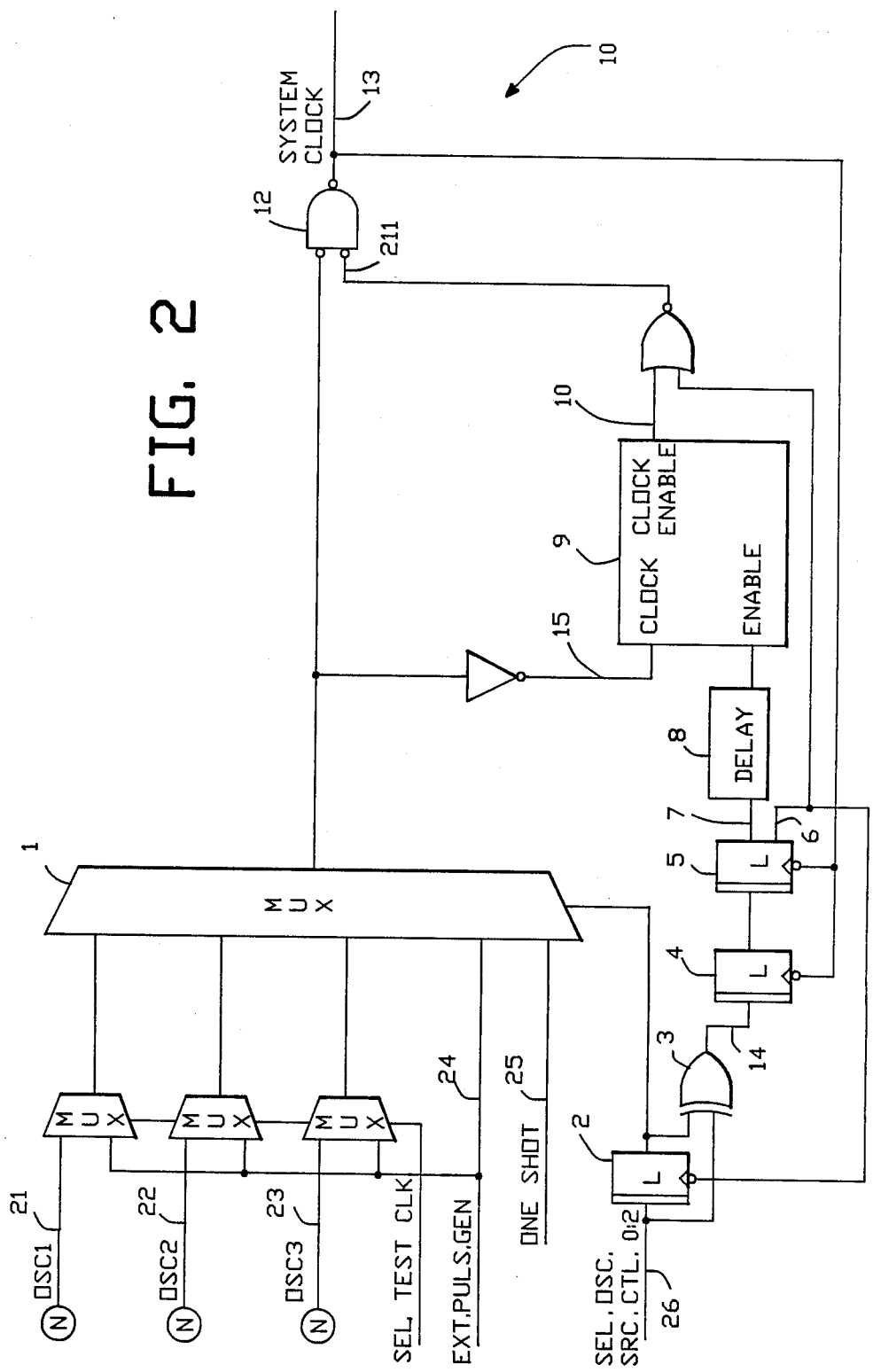
FIG. 2 is a block diagram of a clock switching circuit according to the preferred embodiment of the present invention.

FIG. 2 illustrates a preferred embodiment of the present invention. There is shown a switching circuit 100 receiving a plurality of frequency sources, OSC121, OSC222, OSC323, at multiplexor 1 whereby one of them is gated as the system clock 13. The frequency sources 21, 22, 23 may include a normal margin oscillator, a high margin oscillator and a low margin oscillator. They may also include one or more clock sources from external systems in a multiprocessor system. Other frequency sources may also be connected. For example, the EXT.PULS.GEN 24 provides an input for an external pulse generator which can used for system diagnosis. Similarly, a one-shot circuitry may be connected to the ONE.SHOT input 25.

Switching the system clock 13 to a new frequency is initiated by an external command. This command typically originates from a system control console (not shown) and generally includes a switching signal and address signals of a selected frequency source. The switching signal can be generated, however, by simply detecting changes of the address signals, as is done in this embodiment.

Figure 3:
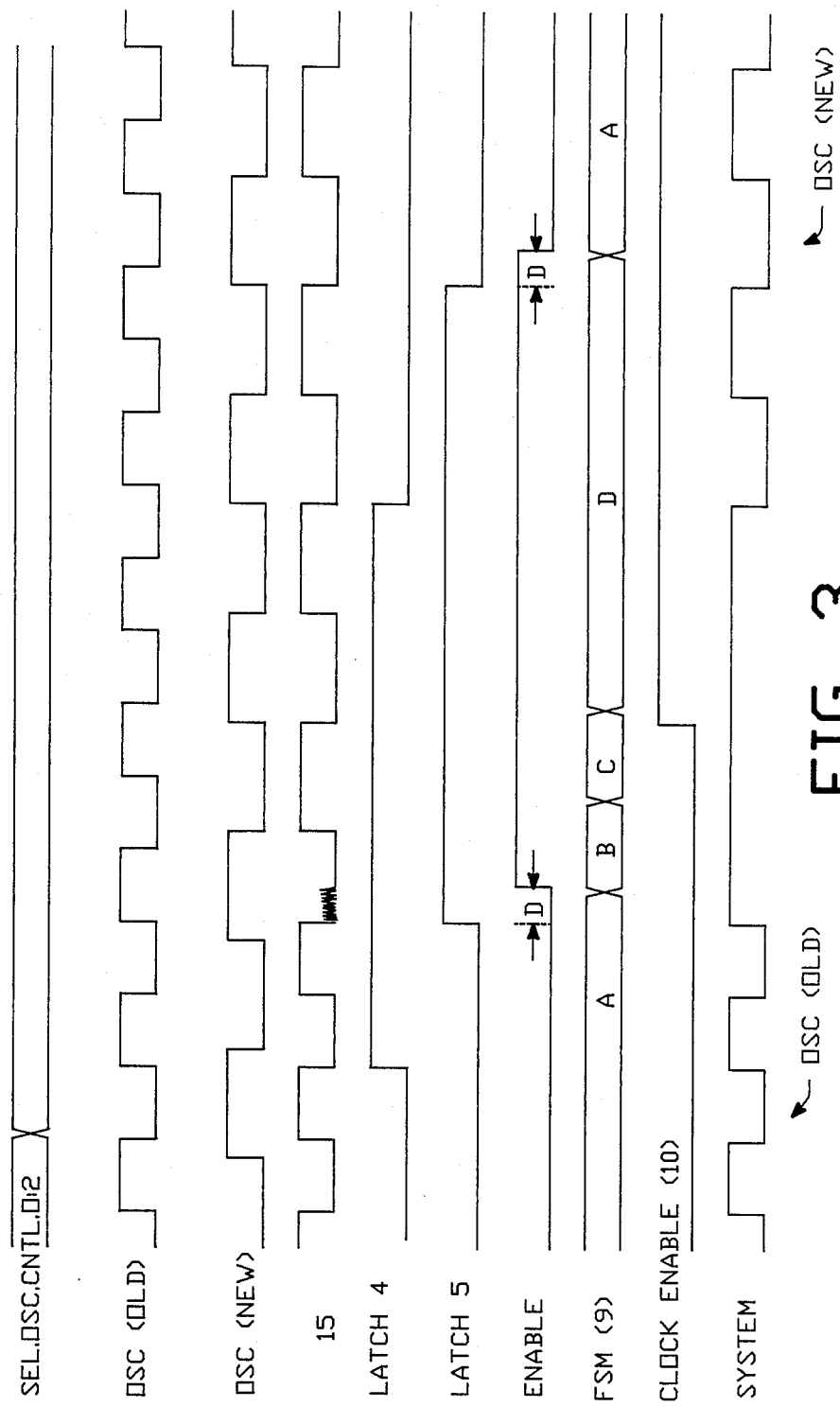
FIG. 3 is a timing diagram illustrating the operation of the switching circuit.

The operation of the switching circuit 200 is now described with reference to FIG. 2 and the timing diagram of FIG. 3. Signals SEL.OSC.SRC.CTL0:226 represent the address signals from the system control console. These signals are received and stored in address register 2. The output of register 2 is in turn used to control multiplexor 1.

Exclusive-Or gate 3 samples the input and content of register 2. It generates a switching signal 14 when there is a detected difference between its two inputs. The switching signal 14 is latched into edge triggered latches 4 and 5. These latches 212, 213 are used to disconnect the old frequency source from the system clock at an inactive clock period. The type of latches used for latches 4 and 5 are chosen depending upon whether the inactive system clock period occurs at its high or low level. If the inactive period is at the high level, they are edge-triggered by either positive (low to high) edges. Otherwise, they are triggered by negative (high to low) edges. Since the latches are triggered by the clock 13, the disconnection is synchronized to the old system clock.

Switching signal 14 appearing at the input of latch 4 will appear as "1" and "0" respectively at outputs 7 and 6 of latch 5 after two system clocks. When the FSM 9 is idle, its output, CLOCK ENABLE, is "0" and system clock 13 will be disconnected from the old frequency source by signal 11 at the AND gate 12 two cycles after switching signal 14 appears.

The FSM 9 is implemented in this embodiment with the assumption that the inactive period of the system clock 13 is defined at the high logic level of a cycle. Inputs to the FSM 9 include an ENABLE signal and a CLOCK signal. The ENABLE signal is derived from output 7 of latch 5 delayed by delay line 8. The delay line 8 controls the sequence of operations by allowing CLOCK 15 to become stable before ENABLE becomes active.

FSM 9 synchronizes the connection of the new frequency source to the system clock (i.e. at an inactive system clock period). It accomplishes this by sampling the new frequency signals to search for a negative transition. When a negative transition is found, the FSM 9 overrides the previously set disable signal at 11.

The operation of the finite state machine (FSM) 9 is now described with reference to its state diagram in FIG. 4. The FSM 9 has four states, A41, B42, C43 and D44. In state A41, the FSM 9 waits for the ENABLE signal to go high and the CLOCK signal at 15 to go low. When these two conditions occur, FSM 9 goes to state B42. In state B42, the FSM 9 waits for the CLOCK signal at 15 to go high. When this occurs, FSM 9 goes to state C43, where it waits for the CLOCK signal at 15 to go low. This causes the FSM 9 to enter state D44, wherein a CLOCK ENABLE signal 10 is generated to enable gate 12. FSM 9 returns to state A41 when the ENABLE signal is dropped.

Figure 4:
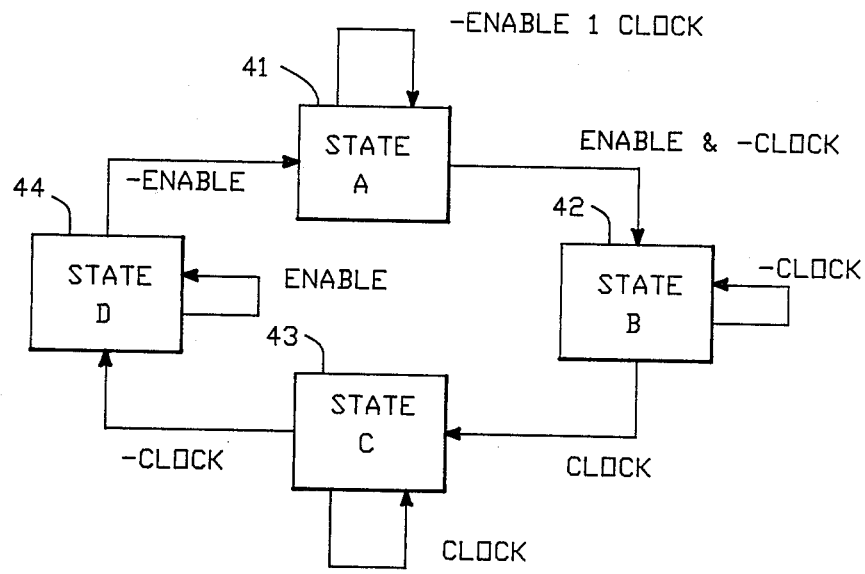
FIG. 4 is the state diagram of the finite state machine 9 of the circuit in FIG. 2 that synchronizes the new frequecy source to the system clock.
Figure 6:
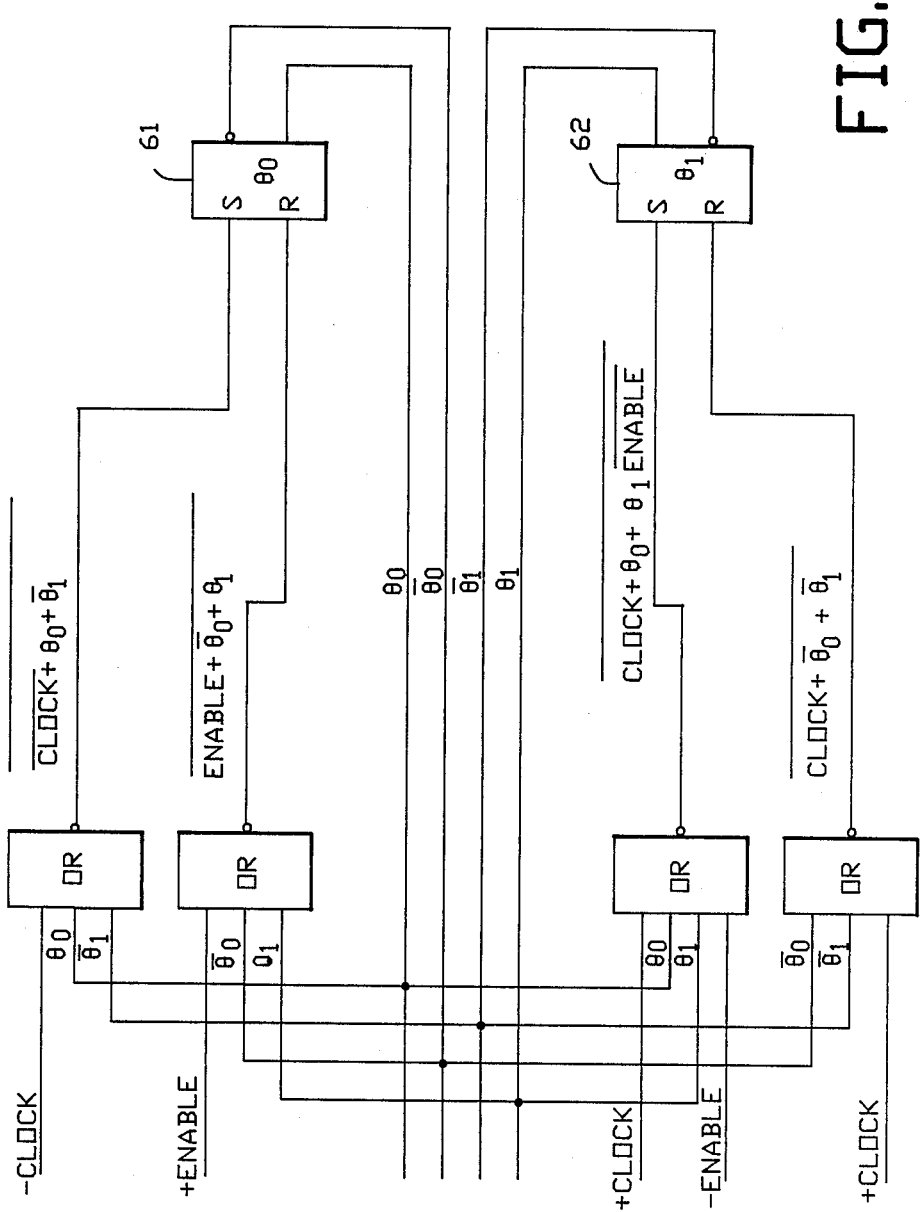
FIG. 6 illustrates a circuit implementation of the finite state machine.

To summarize, the transition of the states of FSM 9 as shown in FIG. 4 has the following logic equations:

$A = (D$ and $-$ENABLE$)$ or $(A$ and $(-$ENABLE or CLOCK$))$ $B = (A$ and $($ENABLE and $-$CLOCK$)) + (B$ and $-$CLOCK$)$ $C = (B$ and CLOCK$)$ or $(C$ and CLOCK$)$ $D = (C$ and $-$CLOCK$)$ pr $(D$ and ENABLE$)$ Since its input signals have no fixed timing relationship, glitches may occur in the FSM 9. To ensure proper operation thereof, the states of the FSM 9 according to this preferred embodiment of the invention are implemented with two Set-Reset latches Q061, Q162 as illustrated in FIG. 6. The states of the FSM 9 according to the embodiment is

| FSM STATE | Q0 | Q1 |
|---|---|---|
| A | 0 | 0 |
| B | 0 | 1 |
| C | 1 | 1 |
| D | 1 | 0 |

From the above logic equations and the above table, the equations are for the Set and Reset inputs of each latch Q061 and Q162 are $$\text{Set}_{(Q1)} = -Q0 \text{ and } -Q1 \text{ and ENABLE and } -\text{CLOCK}$$
$$= -(Q0 \text{ or } Q1 \text{ or } -\text{ENABLE or CLOCK})$$
$$\text{Set}_{(Q0)} = -Q0 \text{ and } Q1 \text{ and CLOCK}$$
$$= -(Q0 \text{ or } -Q1 \text{ or } -\text{CLOCK})$$
$$\text{Reset}_{(Q1)} = Q0 \text{ and } Q1 \text{ and } -\text{CLOCK}$$
$$= -(-Q0 \text{ or } -Q1 \text{ or CLOCK})$$
$$\text{Reset}_{(Q0)} = Q0 \text{ and } -Q1 \text{ and } -\text{ENABLE}$$
$$= -(-Q0 \text{ or } Q1 \text{ or ENABLE})$$

When the output 6 of latch 5 becomes "0", it gates the newly selected frequency address into latch 2, thereby resetting the output of XOR gate 3. As a result, latches 4 and 5 would be reset when system clock 13 is re-enabled. When the "0" signal at 7 of latch 5 is propagated to the ENABLE input of FSM 9, it will cause FSM 9 to drop the CLOCK ENABLE signal and return to state A. Since the signal at output 6 has become "1" before CLOCK ENABLE goes to "0", gate 12 is still enabled. At this point the switching process is done.

As the frequency sources are not synchronized, there may be glitches caused by this new switching process. However, since system clock 13 is inhibited by the output 6 of latch 5, no glitch will be transmitted to the system clock.

Figure 5:
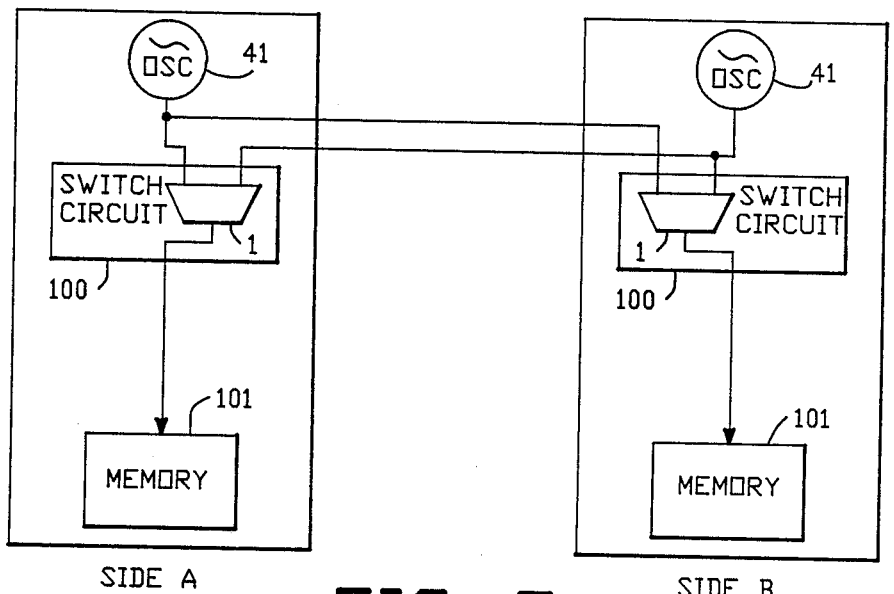
FIG. 5 is a block diagram of a multiprocessor system employing the switching circuit of the present invention.

FIG. 5 is a block diagram illustrating a multiprocessor system wherein the switching circuit 100 is utilized to allow the processors to operate as a tightly-coupled system. The multiprocessor system comprises at least two otherwise individual systems, side A and side B, each having its own memory unit 101. Each memory unit 101 is operated by a system clock supplied from a circuit 100 in the correpsonding system. When combined into a tightly-coupled system, the memory units 101 are concatenated into one logical module accessible to the processors on each side. In the tightly-coupled configuration, however, both sides are typically operated under a single system clock.

To allow dynamic reconfiguration of system (i.e. from two isolated systems to a tightly-coupled system or vice versa), the frequency sources 41, 42, of the respective systems are cross-coupled into inputs OSC1, OSC2, ... of multiplexor 1 of a switching circuit 100 in each system. The system clock of each is thereby dynamically switchable between its internal source and an external source, depending on the desired system configuration.

It can be seen that to accommodate more frequency sources, few substantial changes, such as changing the multiplexor and the selection lines are involved. In general, changes needed for selecting n frequency sources involve adding ($\log_2 n$)-1 selection latches, and changing the multiplexor to an n to 1 multiplexor.

We claim:

1. A circuit responsive to a switching signal for dynamically switching a system clock from a first one to a second one of a plurality of frequency sources, comprising:

means responsive to said switching signal for disconnecting said first frequency source from the system clock during an inactive clock period; and means coupled to said disconnecting means for connecting said second frequency source to the system clock, comprising:

gating means receiving said plurality of frequency sources for gating a selected frequency source in response to a given frequency source address;

asynchronous means receiving said selected frequency source for detecting an inactive cycle period therein in response to said switching signal, and for connecting said selected frequency source to the system clock during said inactive cycle period; and means coupled to said gating means and said asynchronous detecting means for sequencing said gating means and said asynchronous detecting means.

2. The circuit as in claim 1 wherein said disconnecting means comprises a plurality of edge triggered latches.

3. The circuit as in claim 1 wherein said gating means is a multiplexor.

4. The circuit as in claim 1 wherein said sequencing means is a delay line.

5. The circuit as in claim 1 wherein said asynchronous detecting means is a finite state machine.

6. The circuit as in claim 5 wherein said finite state machine has a first state A, a second state B, a third state C and a fourth state D, having the respective transition logic equations of:

$$A = (D \text{ and} - \text{ENABLE}) \text{ or } (A \text{ and } (-\text{ENABLE or CLOCK}))$$

$$B = (A \text{ and (ENABLE and } -\text{CLOCK})) + (b \text{ and} - \text{CLOCK})$$

$$C = (B \text{ and CLOCK}) \text{ or } (C \text{ and CLOCK})$$

$$D = (C \text{ and} - \text{CLOCK}) \text{ pr } (D \text{ and ENABLE})$$

where CLOCK is a predetermined signal from said selected frequency source and ENABLE is a delayed signal of said predetermined signal.

7. A circuit responsive to a switching signal for dynamically switching a system clock from a first one to a second one of a plurality of frequency sources, comprising :

means responsive to said switching signal for disconnecting said first frequency source from the system clock during an inactive clock period; and means coupled to said disconnecting means for connecting said second frequency source to the system clock, comprising:

a multiplexor receiving said plurality of frequency sources for gating a selected frequency source in response to a given frequency source address;

as asynchronous finite state machine receiving said selected frequency source for detecting an inactive cycle period therein in response to said switching signal and for connecting said selected frequency source to the system clock during said inactive cycle period; and means coupled to said multiplexor and said asynchronous finite state machine for sequencing said multiplexor and said asynchronous finite state machine.

8. The circuit as in claim 7 wherein said finite state machine has a first state A, a second state B, a third state C and a fourth state D, having the respective transition logic equations of:

$$A = (D \text{ and} - \text{ENABLE}) \text{ or } (A \text{ and } (-\text{ENABLE or CLOCK}))$$

$$B = (A \text{ and (ENABLE and } -\text{CLOCK})) + (B \text{ and} - \text{CLOCK})$$

$$c = (B \text{ and CLOCK}) \text{ or } (C \text{ and CLOCK})$$

$$D = (C \text{ and} - \text{CLOCK}) \text{ pr } (D \text{ and ENABLE})$$

where CLOCK is a predetermined signal from said selected frequency source and ENABLE is a delayed signal of said predetermined signal.

9. In a multiprocessor system having a first processor and a second processor, said first processor operating on a first system clock generated from a first frequency source when operating alone, and said second processor operating on a second system clock generated from a second frequency source when operating alone, a circuit for allowing said first processor to dynamically couple with the second processor by allowing said first processor to dynamically switch from said first frequency source to said second frequency source, the circuit comprising:

means responsive to a switching signal for disconnecting said first system clock from said first frequency source during an inactive clock period; and means coupled to said disconnecting means for connecting said second frequency source to said first system clock, comprising:

a multiplexor receiving said first frequecy source and said frequency source for gating a selected frequency source in response to a given frequency source address;

an asynchronous finite state machine receiving said selected frequency source for detecting an inactive cycle period therein in response to said switching signal and for connecting said second frequency source to the first system clock during said inactive cycle period; and means coupled to said multiplexor and said asynchronous finite state machine for sequencing said multiplexor and said asynchronous finite state machine.

10. The circuit as in claim 9 wherein said finite state machine has a first state A, a second state B, a third state C and a fourth state D, having the respective transition logic equations of:

$A = (D$ and $-$ENABLE$)$ or $(A$ and $(-$ENABLE or CLOCK$))$ $B = (A$ and $($ENABLE and $-$CLOCK$)) + (B$ and $-$CLOCK$)$ $c = (B$ and CLOCK$)$ or $(C$ and CLOCK$)$ $D = (C$ and $-$CLOCK$)$ pr $(D$ and ENABLE$)$ where CLOCK is a predetermined signal from said second frequency source and ENABLE is a delayed signal of said predetermined signal.

* * * * *